US007594254B2

(12) United States Patent
Parnell et al.

(10) Patent No.: US 7,594,254 B2
(45) Date of Patent: Sep. 22, 2009

(54) SYSTEM AND METHOD FOR TRANSMITTING FILES FROM A SENDER TO A RECEIVER IN A TELEVISION DISTRIBUTION NETWORK

(75) Inventors: James Parnell, Westampton, NJ (US); Matthew Schrier, Holland, PA (US); John Denison, Bensalem, PA (US); John Wurtz, Bryn Mawy, PA (US)

(73) Assignee: Cox Communications, Inc, Atlanta, GA (US)

( * ) Notice: Subject to any disclaimer, the term of this patent is extended or adjusted under 35 U.S.C. 154(b) by 1015 days.

(21) Appl. No.: 10/805,728

(22) Filed: Mar. 22, 2004

(65) Prior Publication Data
US 2005/0210523 A1 Sep. 22, 2005

(51) Int. Cl.
H04N 7/16 (2006.01)
(52) U.S. Cl. ...................... 725/146; 725/116
(58) Field of Classification Search ............ 725/87, 725/97, 100, 131, 116; 709/208, 217, 206; 707/204, 1, 3, 100; 712/23, 32, 41, 201, 712/208
See application file for complete search history.

(56) References Cited

U.S. PATENT DOCUMENTS

| 5,612,956 | A | * | 3/1997 | Walker et al. ............... 370/545 |
| 5,617,541 | A | | 4/1997 | Albanese et al. |
| 5,703,877 | A | | 12/1997 | Nuber et al. |
| 5,953,691 | A | | 9/1999 | Mills |
| 6,088,784 | A | * | 7/2000 | Choquette .................... 712/32 |
| 6,745,192 | B1 | * | 6/2004 | Libenzi ....................... 707/100 |
| 7,359,920 | B1 | * | 4/2008 | Rybicki et al. ............ 707/104.1 |
| 2002/0149675 | A1 | | 10/2002 | Abraham et al. |
| 2002/0194613 | A1 | | 12/2002 | Unger |
| 2003/0093485 | A1 | * | 5/2003 | Dougall et al. ............... 709/208 |
| 2004/0205152 | A1 | * | 10/2004 | Yasuda et al. ................ 709/217 |
| 2004/0228414 | A1 | * | 11/2004 | Keck et al. ............. 375/240.28 |
| 2005/0114751 | A1 | * | 5/2005 | Ungstad ....................... 714/781 |

FOREIGN PATENT DOCUMENTS

| EP | 0 668 697 A2 | 8/1995 |
| EP | 0 785 675 A2 | 7/1997 |
| EP | 0 849 958 A2 | 6/1998 |
| EP | 0 917 356 A | 5/1999 |
| EP | 05 72 4907 | 2/2007 |

* cited by examiner

Primary Examiner—Joseph P Hirl
Assistant Examiner—Joshua Taylor
(74) Attorney, Agent, or Firm—Merchant & Gould

(57) ABSTRACT

A system and method for transmitting files from a sender to a receiver in a television distribution system, for example, a cable television distribution network, is provided. The files are transmitted without the need for transmitting a directory over an out of band communications link. In an exemplary embodiment, a filename corresponding to a file to be transmitted is provided to a transform. The transform calculates a PID based on the filename. The calculated PID is incorporated into the MPEG2 data stream carrying the corresponding file contents. When an application program running in the receiver requests a file, the filename of the requested file is provided to a transform operating in the receiver. The transmitter and receiver transforms are identical. The transform provides a corresponding PID at its output. The PID is used to tune a PID filter on the receiver end such that the requested file is selected from the incoming MPEG bit stream for processing by the processor.

45 Claims, 10 Drawing Sheets

SYSTEM AND METHOD FOR TRANSMITTING FILES FROM A SENDER TO A RECEIVER IN A TELEVISION DISTRIBUTION NETWORK

FIELD OF THE INVENTION

The invention relates to electronic information distribution systems. More particularly, the invention relates to television distribution systems and networks including multiplexed bit streams having a system or transport layer and one or more layers of compressed digital video and digital audio data, and more particularly to transport mechanisms for transporting files over said distribution system.

DETAILED DESCRIPTION

Figure 1:
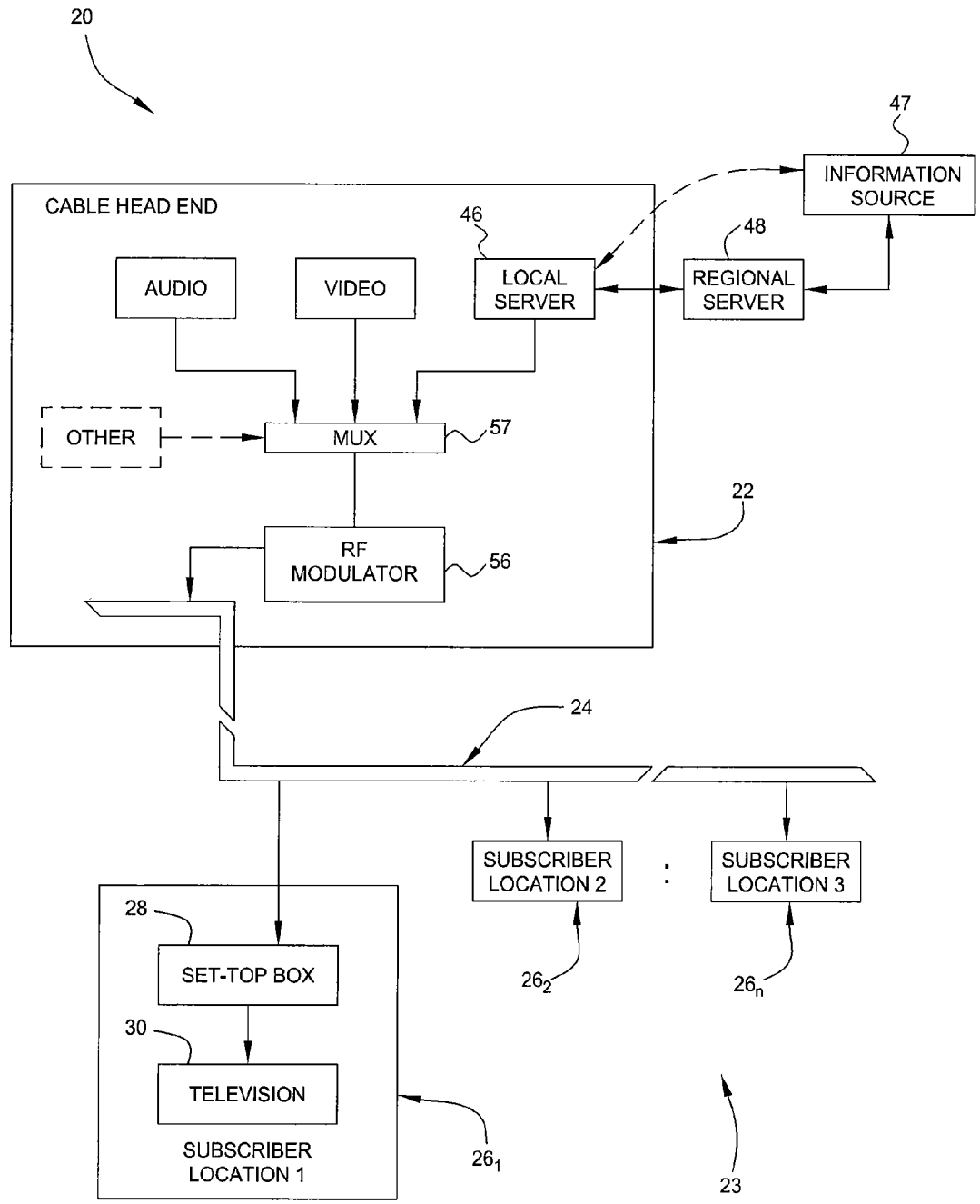
FIG. 1 depicts a block diagram of an information distribution system according to an embodiment of the present invention.

CABLE SYSTEM. Turning to the drawings and referring first to FIG. 1, there is shown an example of a system generally designated 20 into which the present invention may be incorporated. In general, the system 20 transmits signals comprising video, audio, program guide information and other information from a cable head-end 22 onto a coaxial cable transmission medium 24. The signals are received at a plurality of subscriber locations $26_1$-$26_n$. At least one of the subscriber locations, such as the location $26_1$ at a subscriber end 23 of system 20, includes a digital set-top box 28 or the like equipped to convert the transmitted signals into signals capable of being received by a television set 30 for displaying video images and/or outputting audio, and for displaying television program information to a consumer end-user. Of course, the present invention does not require coaxial cable as the physical transmission medium, as signals can alternatively be transmitted over any transmission medium, including wireless means such as so-called "wireless cable" broadcasts, digital satellite communication, and so on.

As shown in FIG. 1, head-end 22 includes a local server 46 adapted to communicate with at least one information source 47. For purposes of this specification, a "server" is a computer that controls a repository of information files that can be downloaded, transmitted, or manipulated in some manner. The general term server, as used here, includes at least one file storage medium as a repository of information. Suitable file storage media include magnetic and optical disks, magnetic tape, floppy disks, and semiconductor memory including Random Access Memory (RAM), Read Only Memory (ROM) and the like. For purposes of this specification, the term "information" means any representation of knowledge or intelligence, e.g., data, computer programs, messages, files, signals and the like, whether analog or digital. Information further includes multimedia representations and media objects, e.g., still images, video objects, audio objects, text, graphics, and the like.

In one embodiment of the invention, information source 47 provides information such as TV schedule and channel lineups, as well as cable system channel assignments for electronic programming guide (EPG) services. One example of such an information source is Tribune Media Services (TMS). TMS is a media content company that provides syndicated information and entertainment products to print, electronic and on-air media. Other types information sources 47 include, but are not limited to, movie listings, games, puzzles, lottery information, photos, weather services, advertising, live and archival broadcast of interactive service content including electronic encyclopedias, electronic catalogs, downloadable applications and the like.

In some embodiments of the invention, a regional information server 48 receives information from media service 47. Regional information server 48 then distributes the received information to a plurality of local servers 46. In other embodiments of the invention, information source 47 communicates with local server 46 without the use of regional information server 48. Information is stored in memory on local server 46 in files. For purposes of this specification a "file" is a collection of information that has associated therewith a file identifier, for example, a filename. There are many different types of files, for example, data files, text files, graphics files, video files, program files and the like. File names and their associated indices are typically themselves stored in files known as directory files. In some embodiments of the invention, a filename includes a directory path that identifies the file's location in the directory hierarchy.

In one embodiment of the invention, information source 47, regional information server 48 and local server 46 communicate via the Internet. In an alternative embodiment of the invention, information files are authored on an authoring system (not shown) within cable headend 22 and stored on local server 46, without the need for downloading files from regional server 48 or information source 47.

The contents of files stored on local guide server 46 are multiplexed by multiplexer 57 with program video, audio, and other information to provide a Motion Picture Experts Group 2 (MPEG2) standard data stream. One example procedure for transporting the data stream from the transmitting end to the receiving end of the system, and for thereafter decompressing the bitstream at the receiving end is specified in International Standards Organization (ISO) 13818-1. ISO 13818-1 is the systems, or transport, layer portion of the MPEG 2 standard. This portion of the standard specifies packetization of audio and video elementary packet bitstreams.

The MPEG2 data stream is modulated onto cable transmission medium 24 by modulator 56. In one embodiment, modulator 56 outputs twenty-seven megabits per second (27 Mb/s) MPEG2 transport streams modulated onto an intermediate frequency (IF) carrier. The MPEG2-encoded transport streams are received by an intermediate frequency to radio frequency (IF/RF) up converter which modulates the streams onto six megahertz (analog) channels and injects the signals onto the cable transmission medium 24. With multiplexing of multiple, packetized digital signals per six megahertz analog channel, hundreds of digital channels may be injected onto a single coaxial medium, although at present a mixture of analog and digital channels will likely be transmitted.

DATA CAROUSEL. In one embodiment of the invention, local server 46 includes a carousel delivery application for delivering a carousel 50 (illustrated in FIG. 3) of data files from local file server 46 to set-top box 28. Data from files residing on local server 46 are multiplexed onto at least one channel by multiplexer 57 to produce a carousel data stream for modulation onto a six megahertz channel of the transmission medium 24. The term "carousel" refers to a system in which a data set is repeatedly broadcast so that it may be accessed as required by many receivers. In that manner, files are sequentially relayed in cyclical fashion and thereby made available to set top box 28. A subscriber 26 can interact with the set-top box 28 to selectively display file information from the carousel on the screen of the television set 30. A variety of conventional carousel techniques exist. One example mechanism for periodically broadcasting the data via the broadcast delivery network is defined in the MPEG-2 DSM-CC specification (ISC/IEC 13818-6 IS). Other hardware and software mechanisms for providing a data carousel are suitable for use in embodiments of the invention employing a carousel.

FILE SERVER GENERIC DESCRIPTION. In one embodiment of the invention, local server 46 comprises a rack-mounted personal computer, including an Intel Corporation P6 200 megahertz (or better) central processing unit, 128 megabytes of RAM, a two gigabyte or larger hard disk drive, and an ISDN or better connection to the Internet for communicating with information source 47 and 48. Examples of alternative file storage media suitable for use in embodiments of the invention include, but are not limited to, magnetic and optical disks, random access memory (RAM), read only memory (ROM), tapes and the like. Local server 46 also typically, but not necessarily includes an Ethernet connection to a headend 22 Local Area Network. One example of an operating system suitable for use on Server 46 is Windows NT Server 4.0. It is important to note that many alternative computer systems and operating systems, for example Unix and Linux based servers, are commercially available and suitable for use in the invention. Although only one local server 46 is illustrated in FIG. 1, two or more local servers may be installed in a head-end 22 for purposes of increased reliability, capacity, or redundancy.

Figure 2:
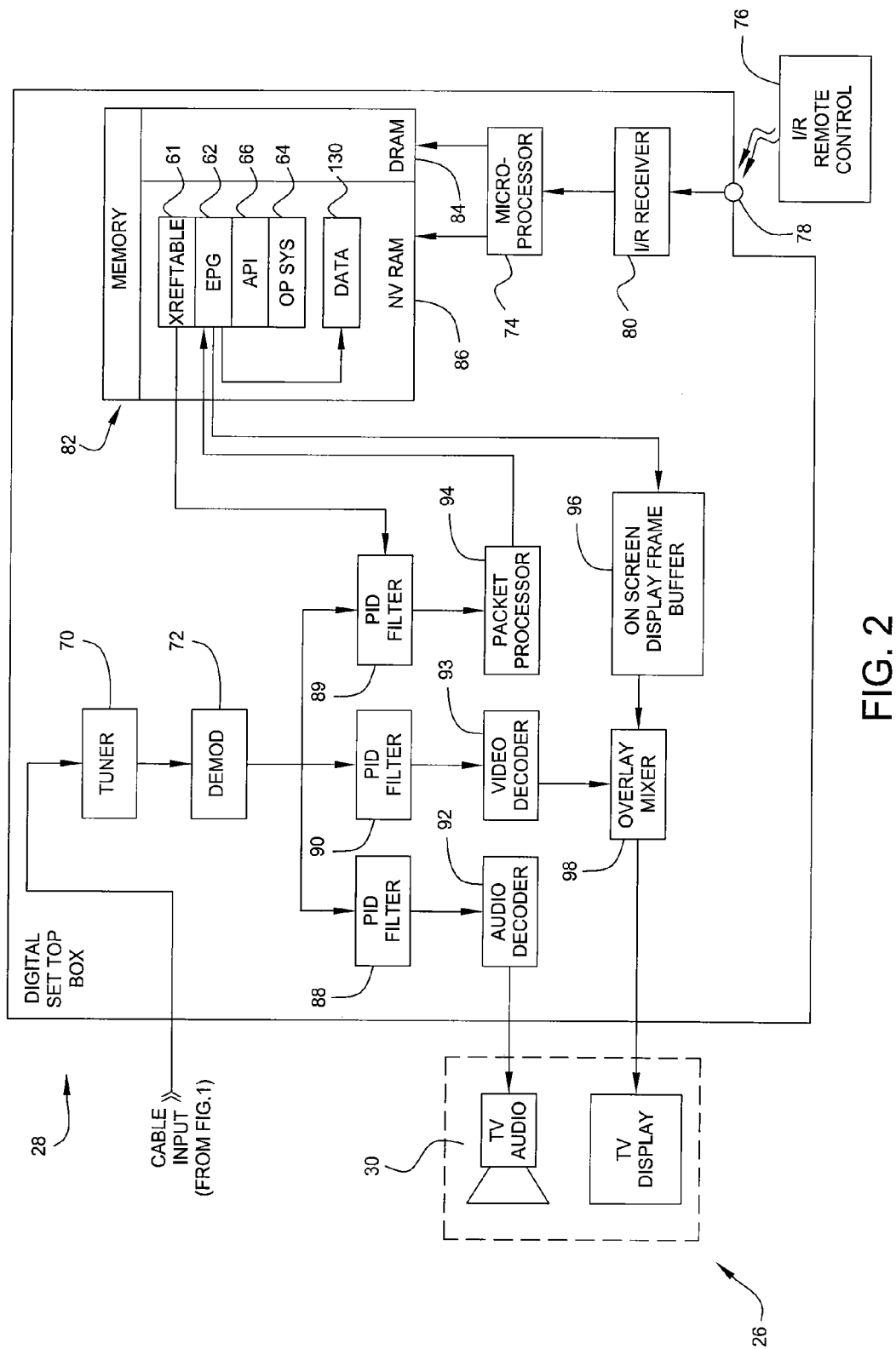
FIG. 2 depicts a block diagram of a receiver suitable for use in the information distribution system of FIG. 1.

RECEIVER. FIG. 2 is a block diagram of an exemplary receiver 28 on subscriber end 23 of system 20. The exemplary receiver is a set top box 28, such as, for example, a DCT-2000 (Digital Consumer Terminal) set top box commercially available from Motorola, Inc. of Horsham, Pa. The DCT-2000 is capable of processing multiplexed MPEG data. In other embodiments, other types of processors are used as receivers. For example, in some embodiments, television 30 includes a cable converter function and other set top box functions without the need for a separate set top unit 28. In other embodiments, receiver 28 is a general purpose computer capable of receiving audiovisual files and other data, using such formats as MPEG I, MPEG II, and MPEG 4, for example. Although the receiver 28 is referred to as a set top box in the discussion of FIG. 2, other embodiments including different types of receivers are suitable for use with the invention.

Although not necessary to the invention, it is significant that with the DCT-2000 set-top box the hardware is unmodified, so that the existing base of publicly distributed set-top boxes may implement the invention without requiring upgrade servicing or replacement. However, to provide enhanced services to subscribers 26, the operation of the box 28 is typically modified by additional application software downloaded thereto. In one embodiment, the application software provided to set top box 28 includes an Electronic Program Guide (EPG) application program 62 which communicates with an operating system 64 of the box 28 by placing calls through an application programming interface (API) 66. An electronic program guide (EPG) is an application that provides an on-screen listing of all programming and content that an interactive television service subscriber or digital television viewer has available to them. In some cases, an EPG includes visual images relating to the promotion, listing or selection of television programs or services, or other services where more than one service is available.

Other embodiments of the invention include other types of application programs for running in set top box 28. These include, but are not limited to, game applications, Channel Hyperlinking™ applications, internet information services applications, to name but a few. Channel Hyperlinking™ is a registered trademark of WorldGate Communications, Inc., and is used to designate application programs that allow a user to request and download content from the World Wide Web via set top box 28. Channel Hyperlinking™ techniques are described in U.S. Pat. Nos. 5,999,970, 5,961,603 and 6,049,539 to Krisbergh and assigned to the assignee of the present invention.

Digital set top box 28 includes an in-band tuner 70, along with an appropriate demodulator 72, for example a 64 quadrature amplitude modulator (QAM) demodulator. Typically, set top box 28 further includes at least one out-of-band (OOB) tuner (not shown) and appropriate OOB demodulator (not shown). An OOB communications link is implemented by an out of band data multiplexer (not shown) at the transmit end, and is typically used by cable television systems to communicate information service-related data to the cable network. This data includes such information as channel maps and email. It is important to note an OOB communication link is not required to implement the present invention.

A microprocessor 74 controls the tuning operation of the tuner 70 and the OOB tuner (not shown) based on commands received from a subscriber via an input device such as a keypad or an infrared remote control device 76, as described below. To receive commands from a subscriber, the set-top box 28 includes an infrared sensor 78 connected to an infrared receiver 80 that provides the command signaling information to the microprocessor 74. In one embodiment of the invention, memory system 82 includes the VRTX operating system 64 stored therein, and generally comprises a combination of volatile dynamic RAM 84 and non-volatile RAM (NVRAM) 86. As those of ordinary skill in the art will readily appreciate, various types and configurations of memory are commercially available and suitable for use in memory system 82.

In accordance with digital broadcasts wherein digitized channels are multiplexed as data packets onto a six megahertz analog channel, the set-top box 28 also includes at least three packet identification (PID) filters 88-90 to extract the appropriate encoded data packets for a user-selected digital channel. Based on the user-selected display, audio and other requirements, microprocessor 74 writes a packet identification value (PID) to each of the PID filters 88-90, whereby the PID filters 88-90 pass only those packets corresponding to the written PID value. As shown in FIG. 2, one of the PID filters, filter 88, provides the filtered packets to an audio decoder 92 which decodes the digital audio data while another PID filter 90 provides filtered packets (for example, MPEG2 encoded packets) to the video decoder 93.

At least a third PID filter 89 is provided to extract other data, including data from files stored on file server 46. A packet processor 94 handles those packets. The set-top box is also equipped with an on-screen display frame buffer (OSD) 96 capable of superimposing alphanumeric characters, other symbols and bitmap graphics over a displayed image. To accomplish this superimposition, an overlay 98 is provided to appropriately combine the video outputs of the video decoder 93 and the OSD 96.

GENERAL FUNCTION. The cable box 28 functions when the user provides an appropriate command to the cable box 28. For example, in response to a digital channel selection command, the microprocessor 74, tunes the in-band tuner 70 to an appropriate analog channel based on the digital channel selected by the subscriber 26. If a digital channel was selected, a table or the like stored in the memory 82 determines the analog channel that carries the digital channel's packets, along with the packet identification numbers (PIDs) corresponding to the selected digital channel, for writing into the PID filters 88 and 90. Once the PIDs have been written, the audio and video decoders 92 and 93 will receive the appropriate packets and decode and output appropriate signals.

ELECTRONIC PROGRAM GUIDES. Advances in technology continue to create a wide variety of services and programs offered to users via television and other video equipment, such as video recorders connected to set top box 28. Such content is disseminated via cable, satellite, broadcast, and terrestrial systems. Content includes, but is not limited to, traditional broadcast and cable television programs, video services such as pay per view (PPV), near video on demand, promotional channels, game channels, localized or specially formatted information, cable-delivered Personal Computer (PC) based content and services, Internet based content and services, and interactive services. Electronic Program Guides (EPGs) provide users with a means for viewing, selecting, interacting with and otherwise controlling available programs, features and services available to them.

RECEIVER—GUIDE DATA. One embodiment of the invention provides a system and method for transporting information files for use in an EPG. In one embodiment of the invention, an EPG is provided on at least one digital channel. In response to a viewer's command to view the EPG, the microprocessor 74 tunes the in-band tuner 70 to an appropriate analog channel based on the digital channel associated with the EPG. At least one table or the like stored in the memory 82 is utilized to determine the radio frequency that carries the selected digital channel's packets. At least one table identifies the PIDs corresponding to the selected channel's audio, video and data. The PIDs are written into the PID filters 88 (for guide audio, if any) and 90 (for video, e.g., background video).

To obtain a file from the carousel, a third PID filter 89 is written with a PID corresponding to the file's filename. Once the data PID has been written to PID filter 89, packet processor 94 will receive the appropriate packets and decode and output appropriate data, for example, data for program guide application 62.

ASSOCIATING PIDS WITH FILENAMES. Regardless of the application running in set top box 28, in order to obtain the contents of a desired file, the PID corresponding to the data stream carrying the desired file in the carousel must be written to PID filter 89. According to one technique, a PID associated with a desired file is obtained from a cross reference table 61 or the like stored in the memory 82. The cross reference table contains directory information that cross references a file identifier, such as a filename, to a corresponding PID that carries the desired file's packets. Typically, such a cross reference table is transmitted from headend 22 to set top box 28 on an Out of Band (OOB) communication link. However, in some embodiments of the invention, the cross reference table is transmitted on an in-band channel.

The PID thus obtained from the cross reference table is used for writing into the PID filter 89. The data passing through the PID filter is provided to application program 62. This approach has a drawback in that the directory information is transmitted on an OOB communications link. The OOB communications link is relatively slow compared to the data transfer rate of in-band communications link. Due to data rate limitations, the OOB communications link sometimes encounters problems when attempting to transmit a directory containing more than about 60 files within the nominal period allowed between successive transmissions of the directory.

Derived Approach.

Figure 3:
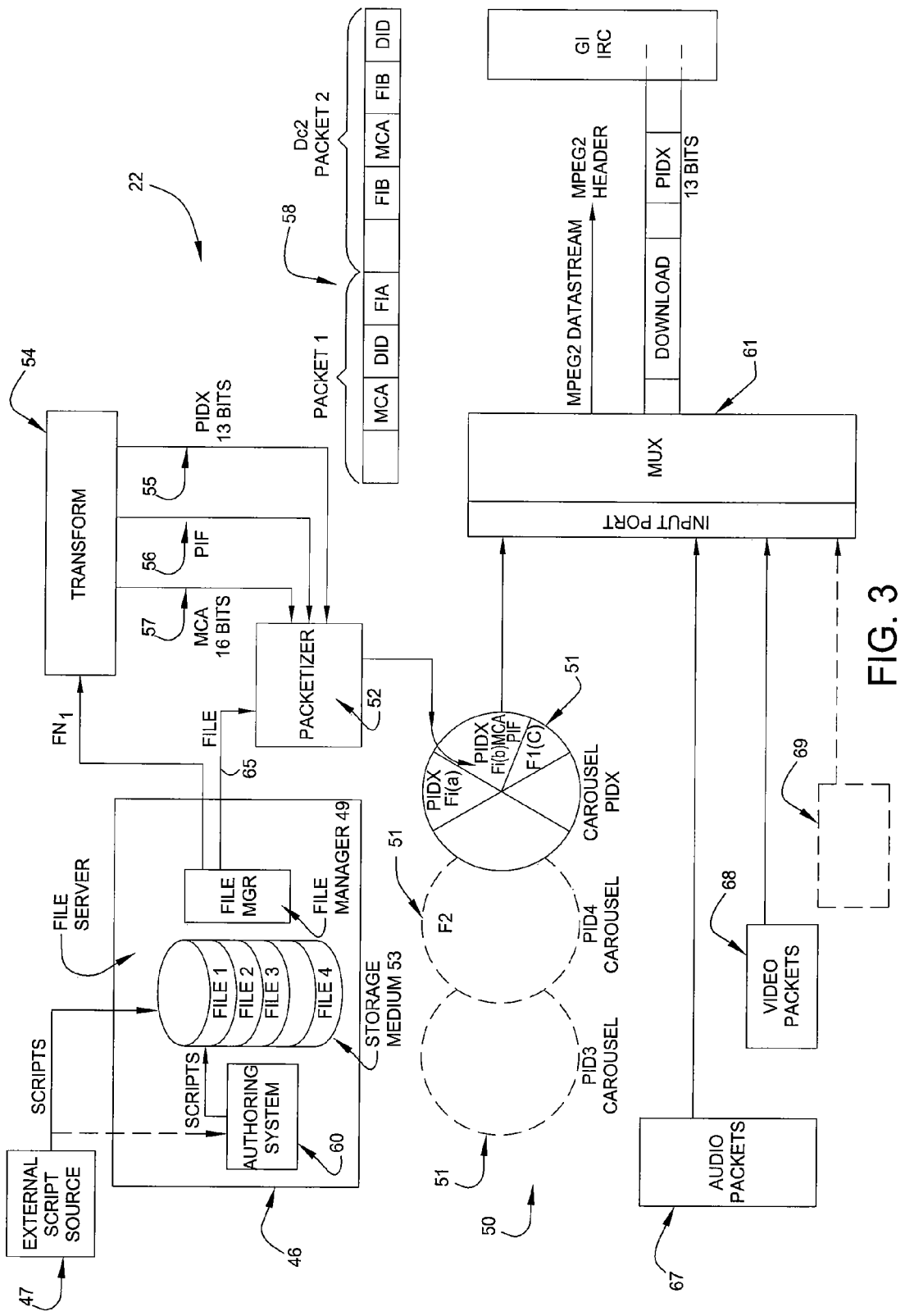
FIG. 3 depicts a block diagram of an information sending system suitable for use in the information distribution system of FIG. 1.

TRANSMIT END. FIG. 3 illustrates in more detail, an embodiment of sender system 22 illustrated in FIG. 1. FIG. 3 illustrates a system and method for associating a filename with a PID, without the need for an OOB communications link. As previously described, local file server 46 includes at least one storage medium 53, file manager 49, and in some embodiments, at least one authoring system 60. Files comprising scripts are stored on storage medium 53. Script files are downloaded from an external script source, for example information source 47 and regional server 48. In some embodiments, files are provided to storage medium 53 by authoring system 60. File manager 49 provides files from storage medium 53 to the remainder of system 22 for transport to subscriber set top boxes 28.

TRANSFORM. File contents 65, e.g., data, of respective files from storage medium 53 are provided to packetizer 52. A file identifier, e.g., filename corresponding to each respective file to be transported is provided to transform 54. In one embodiment of the invention filenames are provided as American Standard Code for Information Interchange (ASCII) coded bits. As those of ordinary skill in the art will recognize, other types of bit coding techniques exist and are appropriate for use in the present invention to represent filenames. Transform 54 operates on a filename at its input to provide, at its output a plurality of bits representing a PID 55. In one embodiment of the invention, PID 55 comprises 13 bits in accordance with the MPEG2 systems specification. In addition to PID 55, alternative embodiments of the invention include bits representing a Payload Identifier (PIF) 56 and a Multicast Identifier (MCI) 57. PIF 56 and MCI 57 are utilized to further distinguish filenames in the event more than one filename is assigned the same PID. Using PID 55 alone, the probability of the same PID being assigned to more than one filename is about 1 in $2^{13}$ in one embodiment of the invention. Using PID 55 together with PIF 56 results in a probability of about 1 in $2^{45}$ that the same PID will be assigned to more than one filename. In embodiments wherein all three portions, PID 55, PIF 56 and MCI 57 are utilized, the probability of the same PID being assigned to more than one filename is about 1 in $2^{61}$ (virtually zero). In one embodiment of the invention, for each filename at its input, transform 54 provides an MCI comprising 16 bits, a PIF comprising 32 bits, and a PID comprising 13 bits . It is to be understood that the terms, PIF and MCI are used herein merely for convenience in designating portions of the output of transform 54. Therefore, many designations for these bit portions could be devised and all such designations remain within the scope of the invention.

Transform 54 operates such that its output is deterministic for a given filename, that is, the same filename always produces the same transform output. Second, no two filenames are likely to produce the same output as discussed above. In one embodiment of the invention, transform 54 operates such that relatively small variations in filenames at its input produce relatively wide variations in the corresponding bit patterns at its output. Transform 54 will be described in more detail below.

DC2 PACKETS. File manager 49 provides file contents 65 to packetizer 52. Packetizer 52 portions the contents of the file into at least one data packet. Packetizing allows for compressed video and audio images to be transmitted over high bandwidth channels such as satellite transmission. In embodiments of the invention wherein an MCI and a PIF are utilized, packetizer 52 inserts the MCI and the PIF provided by transform 54 into at least one data packet along with file contents 65. In a data carousel embodiment of the invention, packetizer 52 provides data packets to carousel system 50. Carousel system 50 comprises a plurality of individual carousels 51, one carousel per PID. Packetizer 52 utilizes the PID 55 of transform 54 to direct the data packets to a corresponding PID carousel 51 of data carousel system 50. Each PID carousel 51 comprises a plurality of packets corresponding to a file to be transported on that PID. In some embodiments thousands of PIDs comprise a carousel system.

Packetizer 52 formats files into data packets in accordance with a formatting convention. One example of a packet formatting convention suitable for use in the invention is the Digicipher II (DC2) format. DC2 is a proprietary format of General Instruments Corporation. Other known techniques for encoding/decoding video images include the Motion Picture Expert Group (MPEG) techniques MPEG 1 and MPEG 2. Current encoding/decoding standards for video telephony include the H.261 and H.263 standards.

Figure 7:
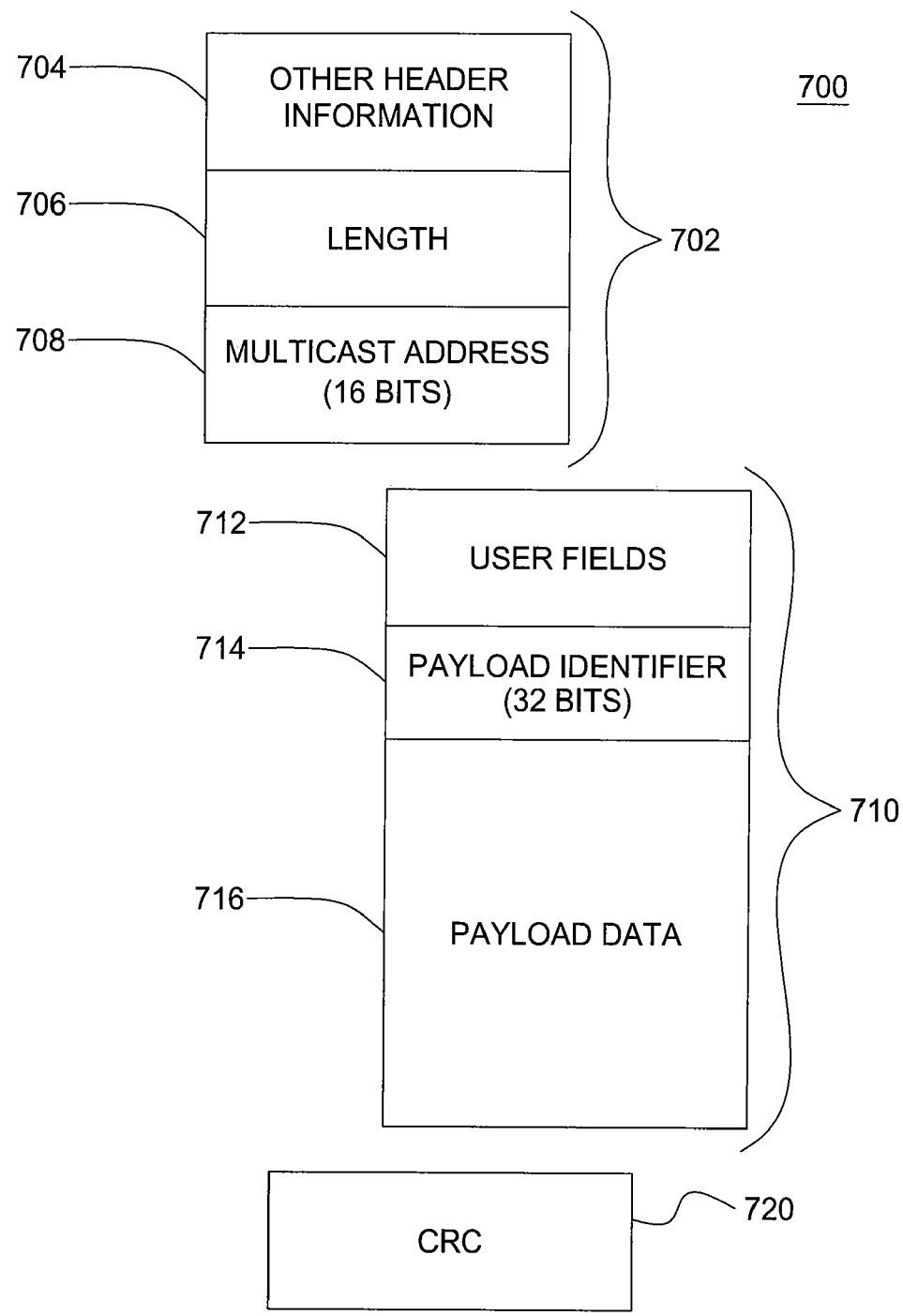
FIG. 7 is a block diagram of a DC2 packet structure suitable for use with the present invention.

FIG. 7 is a diagram of a DC2 packet 700 adapted for use in the invention. Packet 700 includes header 702, including a length field 706, an MCI 57, such as MCA 708, and other header information 704 used in the DC2 format. The user fields 710 include payload indentifier (PIF) 714, payload data 716 and other user defined fields 712. A cyclic redundancy code 720 follows the user fields 710.

Therefore, in embodiments of the invention employing an MCI and a PIF, each DC2 Packet comprises an MCI, a PIF and at least a portion of the data representing the contents of a given file. In many cases a plurality of DC2 packets will be utilized to convey the contents of a single file. Each of the packets corresponding to a given file is assigned the same PID as determined by transform 54.

Figure 10:
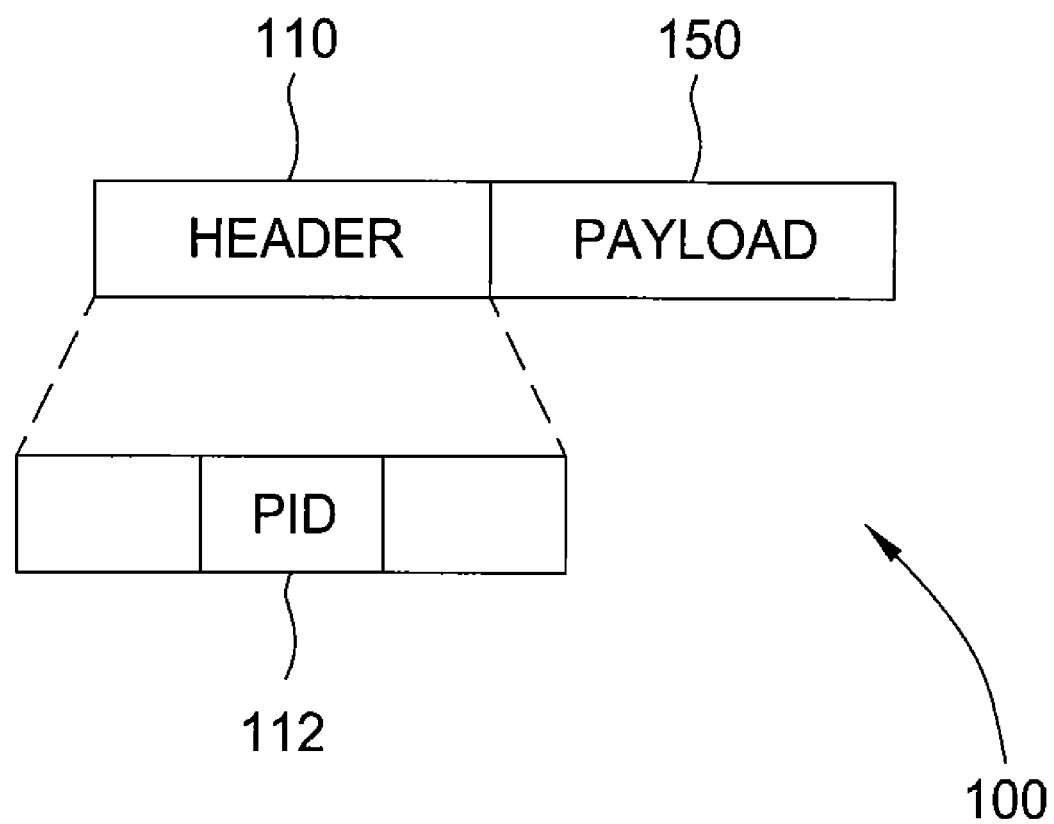
FIG. 10 depicts a block diagram of a MPEG2 packet suitable for use in one embodiment of the present invention.

MPEG2 PACKETS. Returning now to FIG. 3, multiplexer 61 combines inputs provided by carousel system 50, as well as audio 67, video 68, and other 69 packetized inputs to provide a data stream comprising MPEG2 packets for modulation onto a six megahertz channel of the transmission medium 24. An example of an MPEG2 packet according to an embodiment of the invention is illustrated in FIG. 10. Each MPEG2 packet 100 comprises a header portion 110 and a payload portion 150. Together, header portion 110 and payload portion 150 comprise 188 bytes. Header 110 is further portioned into fields. Of particular interest in the present invention is PID field 112. This field comprises the PID corresponding to a file to be transported. Payload portion 150 comprises at least one DC2 packet. Typically a plurality of MPEG2 packets will comprise a single DC2 packet. However, according to an embodiment of the invention, all DC2 packets corresponding to a given file will be carried by MPEG2 packets having the same PID.

The multiplexed data stream may be transmitted over a variety of links. In one embodiment of the invention, the link is a Cable television plant. Other links suitable for use in the invention include, standard Radio Frequency Links (UH-FNHF), Digital Broadcast Satellite Links, Standard Terrestrial Communication Links (PDH, SDH), Microwave Line of Sight (LoS) Links (wireless), Digital Subscriber Links (ADSL family), and Packet/Cell Links (ATM, IP, IPv6, Ethernet) to name but a few.

Figure 8:
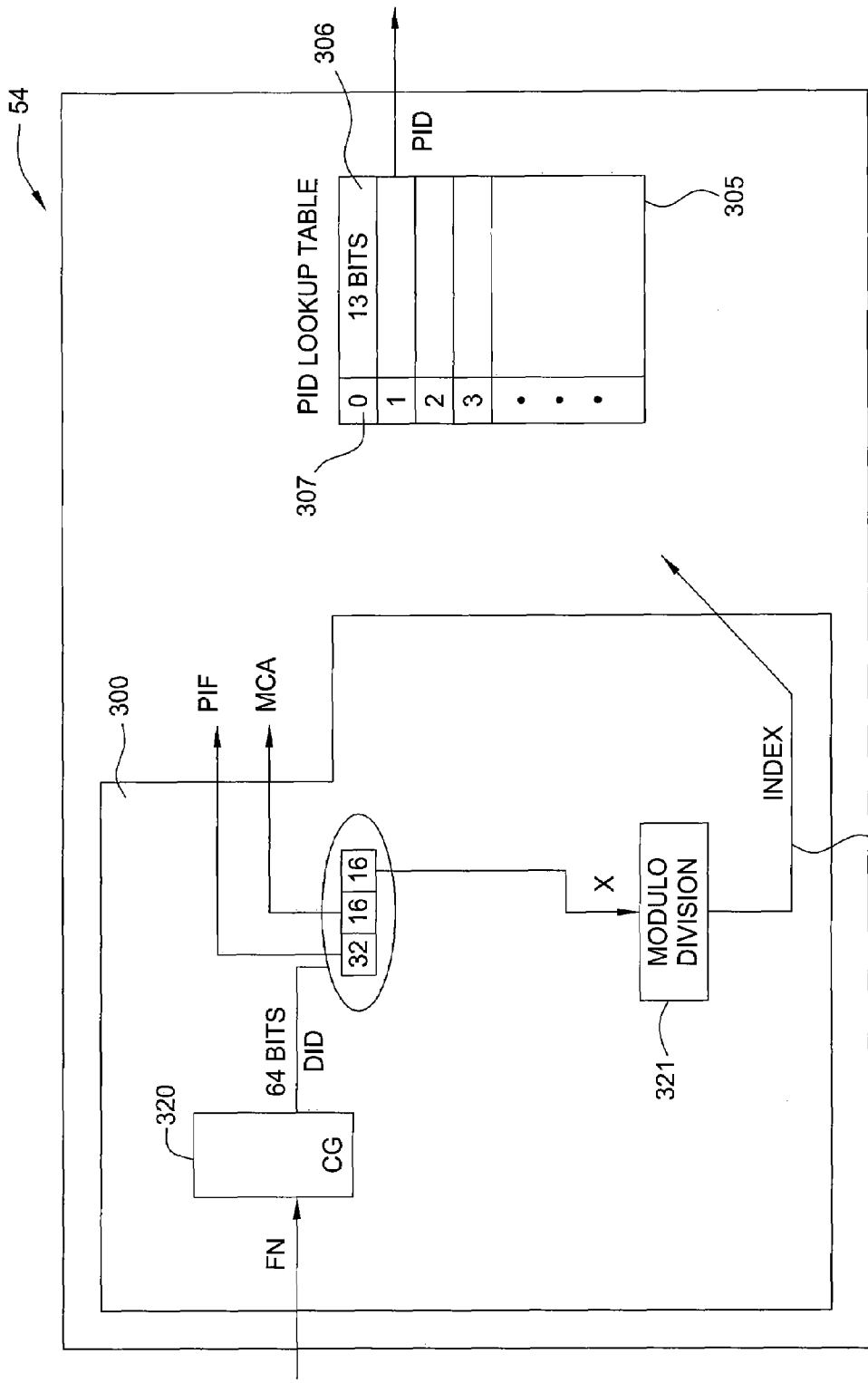
FIG. 8 depicts a functional block diagram of a transform according to an embodiment of the present invention.

DETAILED DESCRIPTION OF TRANSFORM. Turning now to FIG. 8, there is shown a functional block diagram of a transform 54 according to an embodiment of the invention. Transform 54 comprises a calculating function 300 and a PID look-up table (PLT) 305. First, the PLT will be discussed.

PLT 305 is derived from the Program Specific Information (PSI) for an MPEG2 compliant system.

In order to construct the PLT of the invention, at least one range of PIDs available for transport of files is determined. In an MPEG implementation of the invention PIDS are assigned in accordance with the requirements of the MPEG specification and the requirements of the specific system in which the invention is implemented from the (PSI). PLT 305 is constructed by identifying available PIDs, listing the PIDs in a table (illustratively, PLT 305), and providing an index 307 into the listing 306. PLT 305 is transported from headend to receiver on a private data stream. In accordance with MPEG convention, the PID for the private data stream used to transport PLT 305 is identified in the Program Map Table (PMT).

Calculating function 300 operates on respective filenames at its input to provide corresponding indices 307 at its output. Any calculating function having the following constraints is suitable for use in the invention. First, calculating function 300 provides a substantially unique, and repeatable index for each respective filename. Further, the indices provided by calculating function 300 have substantially a one to one correspondence to entries on the PLT 305.

In accordance with one embodiment of the invention, indices are calculated as follows. Respective file identifiers in the form of ASCII strings are provided to a checksum generator (CG) 320, for generating a Data Identifier (DID). In one embodiment of the invention, CG 320 performs a Cyclic Redundancy Check (CRC) on the respective ASCII strings to provide a corresponding 64 bit checksum for each file. In alternative embodiments of the invention, a hash function is utilized to provide the 64-bit DID. In other embodiments, the function is a pseudorandom number generator is utilized to provide the 64-bit DID.

A selected 16 bit portion (designated X) of each 64-bit DID is provided to a modulo divider 321. In one embodiment of the invention, the 16 Most Significant Bits (MSBs) of the 64-bit DID comprise X. Modulo divider 321 provides a PID index 307 at its output for each X at its input. The size of the index 307 is chosen such that all of the PID entries available for use in PLT 305 can be accessed. The number of available PID entries listed on PLT 305 is denoted NPIDSON. In one embodiment of the invention, the PLT table 305 has 4096 entries and the index comprises 12 bits. Other embodiments of the invention have alternative sizes in accordance with the requirements of the system in which the invention is implemented. Modulo divider 321 operates on X to generate PID index 307 in accordance with the relationship:

$$\text{PID index} = X \text{ modulo NPIDSON} \tag{1}$$

The PID index thus generated provides an index into the PLT 305.

As discussed above, some embodiments of the invention employ at least a second identifier, in addition to the PID, in the event that two filenames are assigned the same PID. In one embodiment of the invention, a PIF and an MCI comprise the remaining 32 and 16 Least Significant Bits (LSBs) respectively of the 64-bit DID of CG 320. The choice of which bits, MSBs or LSBs, are utilized is a matter of convenience and either convention is suitable for use in the invention.

Figure 9:
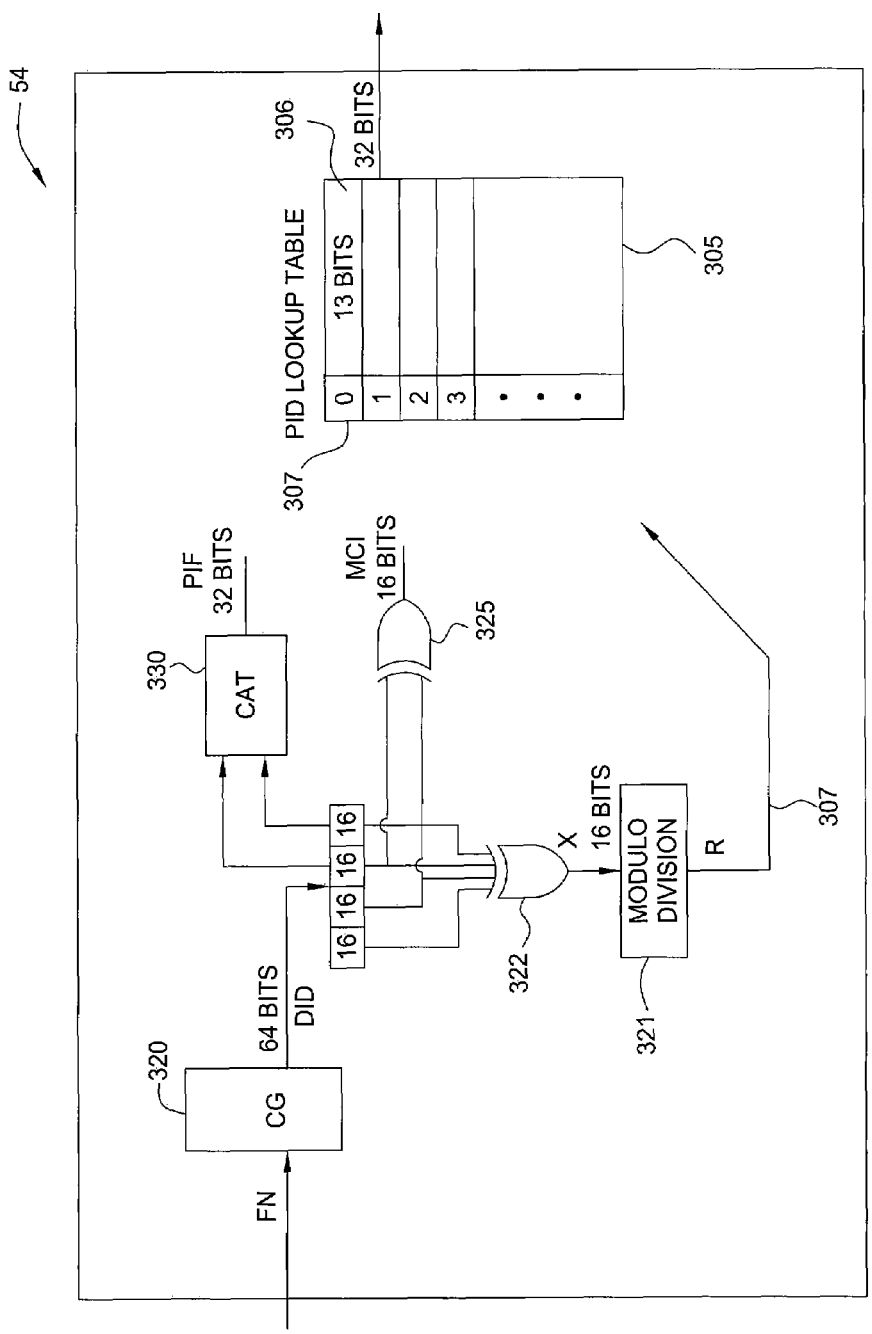
FIG. 9 depicts functional block diagram of a transform according to an embodiment of the present invention.

One of many alternative embodiments of a calculating function for providing a PID, PIF, and MCI is illustrated in FIG. 9. Filename FN is provided to CG 320. CG 320 provides a 64-bit DID at its output. The 64-bit DID is portioned into 4 consecutive 16-bit fields. The four 16-bit fields are provided to XOR function 322 where they are combined in accordance with an exclusive OR operation to provide a 16-bit output X to a modulo divider 321. As described above, modulo divider 321 operates on X to generate PID index 307 in accordance with the relationship:

$$\text{PID index} = X \text{ modulo NPIDSON} \qquad (1)$$

In similar fashion, two of the 16 bit fields are provided to a second XOR function 325. The 16 bit output of XOR function 325 is used as the MCI in embodiments of the invention which employ an MCI to lower the probability of collision.

In some embodiments of the invention, a PIF is formed by concatenating, i.e., stringing together, two 16-bit fields of the 64-bit DID of CG 320. The concatenating operation is performed by concatenator (CAT) 330. In the embodiment illustrated in FIG. 9, the two least significant 16-bit fields are provided to concatenator 330. However, the choice of which two 16-bit fields are provided to concatenator 330 is not critical to the invention. Any two 16-bit fields can be utilized. However, the probability of the event that two filenames being assigned the same PID is related to the degree of correlation between the PID, the MCI and the PIF. The lower the correlation, the lower the probability of that event. Therefore in embodiments of the invention wherein the lowest correlation is desired, the two 16-bit fields chosen to form the DID are different from the two 16-bit fields chosen as a basis for the MCI.

Substantially identical transforms operate in both the sender and the receiver. Both the sender and the receiver employ substantially identical PLTs. The receiver acquires the PLT 305 when it first tunes to the in data band channel.

Changes at the File Server

The contents of file server 46 are subject to change. Files events such as file removal, moving in the directory structure and file updates, to name a few, can occur. In many cases, these changes are relevant to at least one application program 66 running in receiver 28. In one embodiment of the invention, receiver 28, and application program 66 is periodically notified of these types of events. In one embodiment of the invention, notification of file events is provided to receiver 28 via an MPEG2 private data channel. The PID for the private data channel is provided in the PMT. Headend 22 constructs and delivers events and partial directories (referred to as "directory markers") as they change, eliminating the need for the file manager 49 to maintain and permanently store them, and providing real-time synchronization of events and markers with the files to be transported. The available CRC information is also fed back to the server 46, which uses the information for creating standard and alternate markers containing subsets of the directory information.

The exemplary golden PID, such as, for example, PID 600 depicted in FIG. 6 and discussed below in greater detail, carries two bitmaps and the starting PID number. The first bitmap is the PID allocation bitmap which indicates which PIDs are used in the PID calculation.

The second bitmap is the PID usage bitmap (described below), which indicates which PIDs are currently in use. This is a subset of the allocated PIDs. The PID usage bitmap is a standard bitmap shipped with the least significant bit first, i.e., bit 7 of byte 0 corresponds to the first PID in the map.

"FILE NOT FOUND" AND COLLISION CONDITIONS.

A receiver calculates the CRC and PID for a desired file, writes the PID to a PID filter, and waits for MPEG2 data packets assigned to that PID. If the desired data packets arrive within a predetermined period of time, then the file is received. If the predetermined period of time passes, and the receiver has not received the desired unit of data, a "file-not-found" condition exists in which the desired data are considered unavailable. In other embodiments, such as the examples described below, additional features are provided to more rapidly identify a file-not-found condition, to reduce the amount of time it takes the receiver to detect a file not found condition.

Reference is again made to FIG. 3. The file manager 49 includes a directory mapper (described below with reference to FIG. 4) associated with the representative number; the directory mapper generates and transmits to the set top box 28 a partial directory (e.g., marker 416 shown in FIG. 4) identifying each of the at least one file that has respective directory information that transforms to that same PID.

In some embodiments, to detect a file-not-found (FNF) condition with a reduced latency, a combination of strategies is used. Directory "markers" (as shown in Tables 1 and 2, below) are spun periodically on each PID that carries data, as described in greater detail with reference to FIGS. 4-6. The standard markers contain the 64-bit DID number of each file being spun on the PID over which the marker is sent. In these embodiments, the markers provide PID specific directory information. If the set top box 28 sees one of these markers before it sees the file it's attempting to load, it reads the marker to determine whether the file actually exists. The marker spin rate is determined empirically by balancing bandwidth consumption against the desired FNF detection time.

Figure 4:
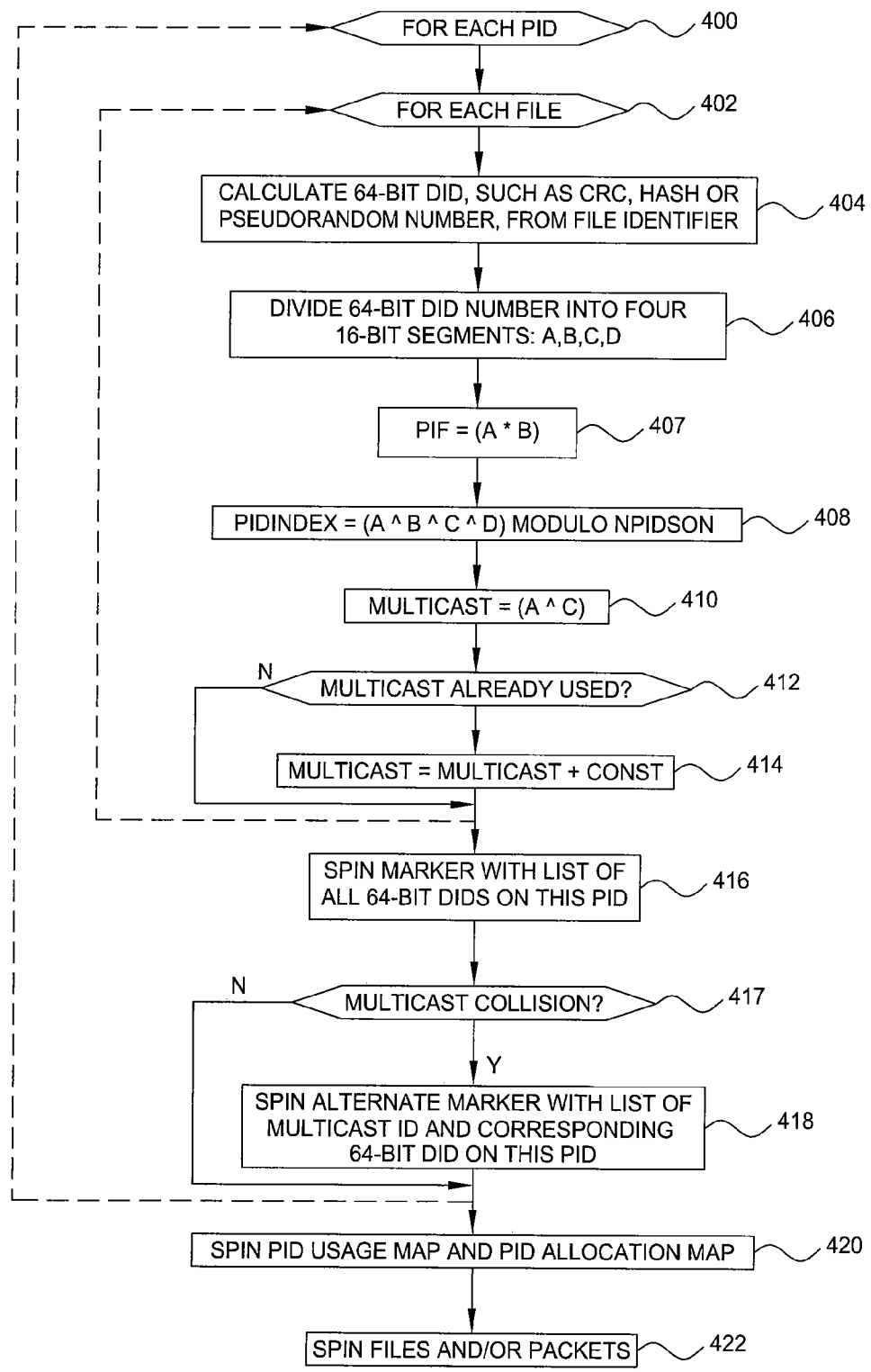
FIG. 4 depicts a flow diagram of a data identifier (DID) and packet identifier(PID) processing method according to an embodiment of the invention.
Figure 5:
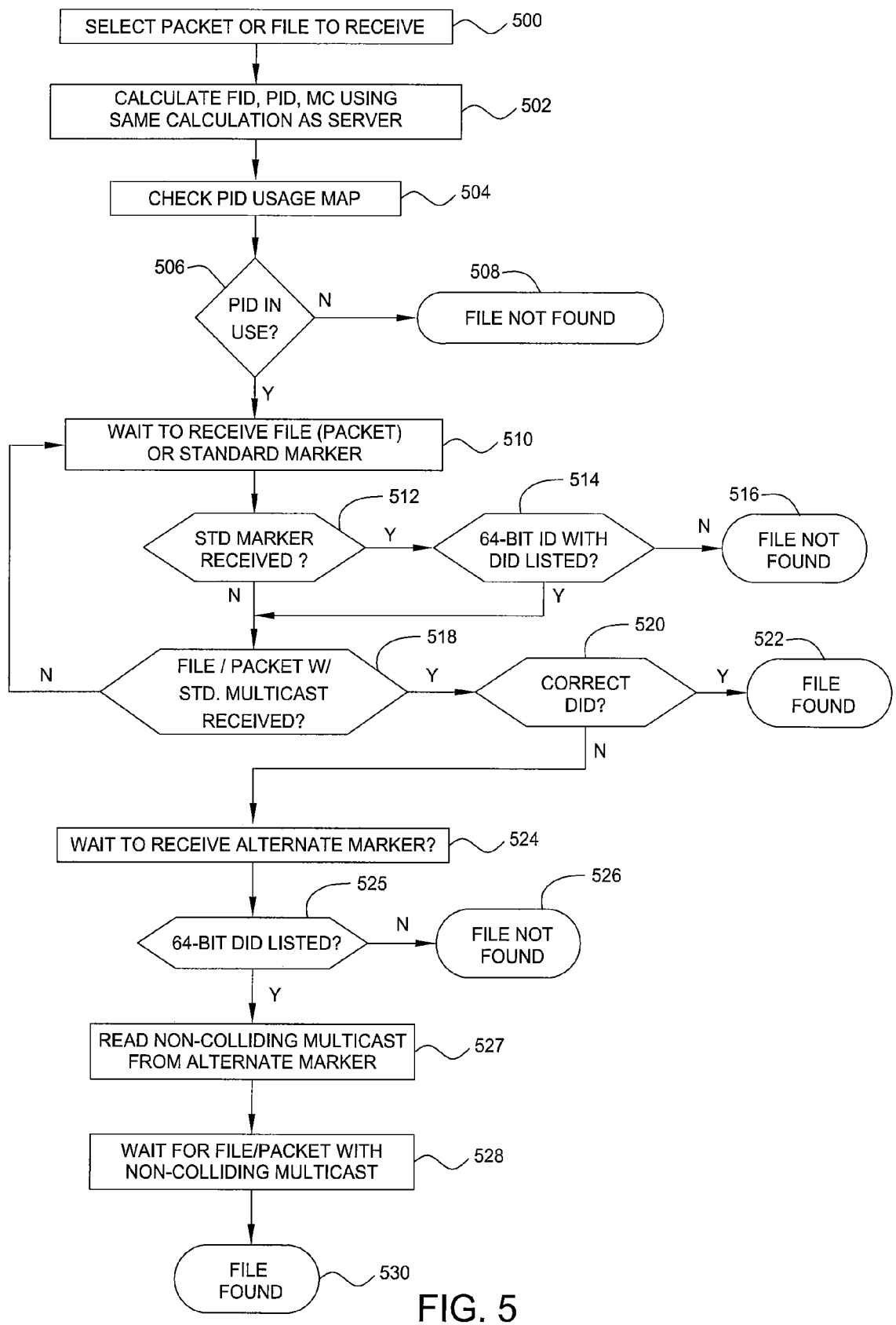
FIG. 5 depicts a flow diagram of a packet receiving method according to an embodiment of the invention.

FIGS. 4 and 5 show the identifier calculation, collision avoidance and FNF latency reduction methods. FIG. 4 is a flow chart diagram showing one example of how a sender (e.g., a cable headend) performs the PIF and PID calculation and transmits the data.

At step 400, the main loop of steps 402-418 is repeated for each PID to be used.

At step 402, an inner loop including steps 404-414 is repeated for each unit of data (e.g., file) to be transmitted by the sender.

At step 404, the sender performs the transform by generating a number with an approximately uniform probability distribution, as a function of a bit sequence (e.g., file name) associated with a unit of data (e.g., packet, file) to be transmitted. The term "function" implies that a given bit sequence only produces one value, in a reproducible manner. If the same bit sequence is input to the transform function three times, the same output is generated three times. In the exemplary embodiments, the generated number is the 64-bit DID described above. The 64-bit length is selected to provide an extremely small likelihood that two different file names will yield the same calculated number. Some embodiments use smaller number lengths to provide any desired probability that two file names will not yield the same number. Other embodiments use larger number lengths to provide any desired probability that two file names will not yield the same number.

At step 406, the 64-bit DID is divided into four 16-bit segments (A, B, C and D), corresponding to the most significant 16 bits, the second most significant 16 bits, the third most significant 16 bits and the 16 least significant bits.

At step 407, the payload ID (PIF) is determined by concatenating the 32 most significant bits of the 64-bit DID.

At step 408, a first portion of the DID is used to calculate the PID. In some embodiments, the PID index in the allocation map is determined by the following equation:

PID index=X modulo NPIDSON, where PID index is an index associated with the PID; X is a result of performing at least one XOR operation on at least two portions of the DID(e.g., cyclic redundancy code, hash function, pseudorandom number); and NPIDSON is a number of allocated PIDs, which, in one embodiment, corresponds to a number of packet processors to which payload files are being sent.

In the exemplary embodiment, all four portions A, B, C and D of the 64-bit DID are XOR'ed together to form X. NPIDSON is any predetermined number (e.g., 2000 PIDs) that does not exceed the available number of PIDs (e.g., 8192) for the type of receivers being connected to the sender. The PID offset equals the value output by the PID allocation map table given the PID index. Once the PID index is determined, a number of on-bits in the PID allocation map are counted, and the PID offset corresponding to the number of counted PIDs provides the assigned PID number. That is, the PID index is an input to a table lookup that outputs the PID offset. The STARTPID value is then added to the PID offset, where STARTPID is a constant value (corresponding to the first PID being used in the PID usage bitmap).

At step 410, a second portion of the number is used as a multicast identifier. In some embodiments, the multicast identifier is formed by performing an XOR operation on two non-contiguous portions of the DID. In the exemplary embodiment, the multicast identifier is a 16-bit number determined by XORing portions A and C of the 64-bit DID.

To allow the receiver to initially recognize a desired unit of data (e.g., packet or file) based on the multicast identifier, it is desirable for the system to assign a unique multicast identifier to each unit of data. However, because there are multiple units of data transmitted with the same PID, and there are only 65,536 possible 16-bit multicast ID's, it is possible for two files with two different bit sequences (e.g., two different file names) to have the same multicast ID. Thus, in this embodiment, a multicast collision detection and correction feature is provided.

At step 412, a determination is made whether the same multicast ID calculated at step 410 has already been assigned to a previous unit of data with a different bit sequence (e.g., file name). This condition is referred to herein as a multicast collision condition.

At step 414, if the sender has detected a collision condition, the sender generates a non-colliding multicast identifier for the second file (packet). In some embodiments, this is accomplished by, for example, adding a constant value to the multicast identifier calculated in step 410, for which the collision condition is detected. The non-colliding multicast address has the same length as the standard multicast address calculated in step 410, for example, 16 bits.

At step 416, in some embodiments, the sender periodically transmits (spins) a standard marker packet or message that includes a list of all of the 64-bit DIDs for the sets of at least one packet (e.g., packets, files, messages) to be sent using the given PID on which that marker is sent. In other embodiments, a file is sent instead of a marker. The marker is a partial directory that only covers the units of data spun on a single PID. A marker is spun on each PID carrying broadband data. In some embodiments, the marker spins at the rate of once every 5-10 seconds. Higher spin rates are possible, but consume more bandwidth. In the exemplary embodiment, the standard marker is a packet, as opposed to a file, and the calculation of MCI, PIF, and PID does not apply to the marker. Instead, a predetermined PID is used to send the markers.

Table 1 shows an example of the contents of a standard marker. In Table 1, each cell $b_{i,j}$ represents the $j^{th}$ portion of the 64-bit DID at row i, of a standard marker containing n entries, corresponding to n sets of at least one packet. Each row of the marker contains four segments A, B, C and D, and corresponds to a single set of at least one packet. Concatenating the four entries $b_{1,j}$ to $b_{4,j}$ in any row forms the full 64-bit calculated DID for one of the sets of at least one packet. Note that in an actual marker, there is no demarcation between the four portions of each 64-bit DID; the cells are only shown as broken into 16-bit chunks for ease of explanation.

TABLE 1

| | | | |
|---|---|---|---|
| $b_{1,1}$ to $b_{1,16}$ | $b_{1,17}$ to $b_{1,32}$ | $b_{1,33}$ to $b_{1,48}$ | $b_{1,49}$ to $b_{1,64}$ |
| $b_{2,1}$ to $b_{2,16}$ | $b_{2,17}$ to $b_{2,32}$ | $b_{2,33}$ to $b_{2,48}$ | $b_{2,49}$ to $b_{2,64}$ |
| $b_{3,1}$ to $b_{3,16}$ | $b_{3,17}$ to $b_{3,32}$ | $b_{3,33}$ to $b_{3,48}$ | $b_{3,49}$ to $b_{3,64}$ |
| . | . | . | . |
| . | . | . | . |
| . | . | . | . |
| $b_{n,1}$ to $b_{n,16}$ | $b_{n,17}$ to $b_{n,32}$ | $b_{n,33}$ to $b_{n,48}$ | $b_{n,49}$ to $b_{n,64}$ |

In some embodiments, the standard marker for each PID is sent using that PID. Thus, the directory information is sent inband, instead of using the OOB channel. For example, if each PID corresponds to a channel, the marker for a given PID is sent on the channel to which that PID corresponds. Similarly, in embodiments having a PID processor for each PID, each respective PID processor is sent the marker file for units of data to be sent to that PID processor. In other embodiments, the standard markers are all sent on the OOB channel. In these embodiments, each marker includes a means by which the receiver is able to identify the PID to which that particular marker pertains (because the OOB channel contains markers corresponding to multiple PIDs on the inband channel).

For a relatively large multicast address (e.g., 16-bits) and relatively large number of PIDs (e.g., 2000) relative to the number of units of data (e.g., 35,000), there is a low probability of two different sets of at least one packet having the same multicast ID. In other words, in the vast majority of cases, for any given PID, any two units of data having the same multicast ID have a high probability of corresponding to the same set of at least one packet. Thus, packet recognition by a recipient is generally achieved more rapidly by comparing the calculated multicast ID to the multicast ID of a received unit of data. That is, packets having a different multicast address from that of the desired file are quickly eliminated from consideration without examining the PIF (32 MSBs of the 64-bit DID) contained in the packet. The PIF is only examined if the desired multicast address is found. However, in preferred embodiments, a multicast collision detection and correction mechanism is desired to positively identify when a multicast collision exists, and eliminate the condition.

At step 417, a determination is made whether a multicast collision exists. If there is no multicast collision, then step 418 is skipped, and step 420 is executed next.

At step 418, in some embodiments, the sender periodically transmits (spins) an alternate marker packet if the sender detects a multicast collision. The alternate marker includes a list of the multicast identifier and the 64-bit DID for each of the sets of at least one packet (e.g., packets, files, messages) to be sent using a given PID. In some embodiments, a message is sent instead of an alternate marker. In other embodiments, a file is sent instead of an alternate marker. Table 2 shows an example of the contents of the alternate marker. In Table 2, each row of the alternate marker corresponds to a single set of at least one packet. The last cell in each row includes the standard multicast address calculated at step 410 (or the non-colliding multicast address if step 414 was executed). Each remaining cell in each row represents the set of 16 bits at row i of an alternate marker containing n entries, corresponding to n sets of at least one packet.

TABLE 2

| | | | | |
|---|---|---|---|---|
| $b_{1,1}$ to $b_{1,16}$ | $b_{1,17}$ to $b_{1,32}$ | $b_{1,33}$ to $b_{1,48}$ | $b_{1,49}$ to $b_{1,64}$ | $MCA_1$ |
| $b_{2,1}$ to $b_{2,16}$ | $b_{2,17}$ to $b_{2,32}$ | $b_{2,33}$ to $b_{2,48}$ | $b_{2,49}$ to $b_{2,64}$ | $MCA_2$ |
| $b_{3,1}$ to $b_{3,16}$ | $b_{3,17}$ to $b_{3,32}$ | $b_{3,33}$ to $b_{3,48}$ | $b_{3,49}$ to $b_{3,64}$ | $MCA_3$ |
| . | . | . | . | . |
| . | . | . | . | . |
| . | . | . | . | . |
| $b_{n,1}$ to $b_{n,16}$ | $b_{n,17}$ to $b_{n,32}$ | $b_{n,33}$ to $b_{n,48}$ | $b_{n,49}$ to $b_{n,64}$ | $MCA_n$ |

Using the alternate marker of Table 2, a receiver that receives a file having the desired multicast address, but the wrong 32-bit PIF checks the alternate marker and determines the non-colliding multicast address corresponding to the DID. Then the receiver waits for a unit of data (e.g., file) having the non-colliding multicast address.

In some embodiments, the alternate marker for each PID is sent inband using that PID. For example, where each PID corresponds to a channel, the alternate marker for a PID is sent over the channel corresponding to that PID. Similarly, in embodiments having a PID processor for each PID, each respective PID processor is sent the marker file for units of data to be sent to that PID processor. In other embodiments, the alternate markers are sent over the OOB channel, and each alternate marker contains a means by which the receiver identifies to which PID that marker corresponds.

The PID allocation map is a bit map having a bit for each PID number capable of being allocated. The bits corresponding to allocated PIDs are set to a first value indicating allocation, and the remaining bits are set to a second value indicating that those PIDs are not-allocated. The PID allocation map is run-length encoded (RLE), with the high bit of each byte indicating the run type ('1' equals 'allocated'), terminated by a zero byte. In practice, the user determines how many PIDs to allocate, and the system selects which PID numbers are allocated to PIDs. A PID usage bitmap indicates which PIDs are currently in use. This is a subset of the allocated PIDs. Any allocated PID for which data are currently being spun has its respective bit set in the PID usage bitmap.

At step 420, the sender periodically transmits a PID usage map. (Although FIG. 4 shows the PID usage map being spun after the standard and alternate markers, the markers are spun on each PID after the PID usage map is spun.) The PID usage map identifies which PIDs are being used to transmit data. For example, in an exemplary system in which 13 bits are used to specify the PID, and about 2000 PIDs are actually used, about one fourth of the 8192 available PIDs are used. The PID usage map identifies which of the PIDs are used. In some embodiments, the PID usage map is a packet (PID usage bitmap) having one bit for each PID, with the value of each bit indicating whether that PID is being used. In some embodiments, the PID usage map is sent using a separate PID that is shared by all of the receivers referred to herein as the "golden PID". In some embodiments, the PID usage map is sent in a message instead of an alternate marker. In other embodiments, the PID usage map is sent in a file instead of a marker.

At step 422, the sender transmits the units of data using the appropriate PIDs. Each unit of data contains the appropriate PIF in its payload and multicast identifier in its header. If a non-colliding multicast ID was generated for a given unit of data, then that unit of data is transmitted using the non-colliding multicast identifier.

In some embodiments, the alternate marker is sent less frequently than the standard marker. The periods for the standard and alternate marker determine the delay that is incurred before a file-not-found condition is recognized in the case of an unavailable file for which the calculated PID is in use. That is, once the PID associated with a desired unit of data is determined to be in use (based on the PID usage map), a file-not-found condition is not detected until: the standard marker is received (in the absence of a multicast collision) or the alternate marker is received (when there is a multicast collision), or the receiver times out without receiving a marker or the desired file. Because the FNF condition is determined based on either the standard or alternate marker contents, a high spin rate is not needed for the alternate maker to maintain a low FNF latency.

FIG. 5 shows a method for receiving a desired packet associated with a bit sequence from a server.

At step 500, the receiver (e.g., a set top box) selects a set of at least one unit of data (e.g., packet, file) to receive.

At step 502, the receiver calculates a DID, PIF, PID, and MCI from the bit sequence (e.g., file name) associated with the desired unit of data, using the same calculation that is used by the sender (as described above with reference to FIG. 4). Mapping of the 64-bit DID to a PID is done using a PID usage map and a modulus (PID index). The settop uses the PID usage map acquired when it first tunes to the inband channel. The PID usage map provides the settop with a starting PID number (which is the first PID in the PID usage map), followed by a Run-Length-Encoded (RLE) bitmap whose "on" bits indicate a PID in use. The modulus is performed on the number of "on" bits in the map. Once the PID index is determined, a number of on-bits in the PID allocation map are counted, and the PID offset corresponds to the number of counted PIDs. Then the PID number is computed by adding the start PID to the actual PID offset of the "on" bit within the map.

At step 504, the receiver checks the PID usage map to determine whether the calculated PID is being used. At step 506, if the calculated PID is not being used, the receiver immediately knows that the desired unit of data is not available, and at step 508, a file-not-found condition is detected.

If the PID usage map indicates that the PID calculated in step 502 is being used, then execution continues, but a final determination has not yet been made by the receiver whether the desired unit of data is available (because more than one file is transmitted using the same PID).

At step 510, the receiver waits to receive either the desired unit of data or a marker, whichever arrives first.

At step 512, if the standard marker is received, then at step 514, the receiver determines whether the received marker includes the calculated 64-bit DID (from step 502) for the desired unit of data. That is, the 32 MSBs of each 64-bit DID in the marker is compared to the 32 bits of the PIF. If no 64-bit DID containing MSBs matching the PIF is included in the standard marker, then at step 516, a file-not-found condition is detected.

If the standard marker does contain a 64-bit DID (from step 502) having a portion that matches the PIF, then step 518 is executed.

At step 518, the receiver waits until a unit of data with the standard multicast address (from step 502) is received. If a packet is received that has a different multicast address from that of the desired packet, the received packet is discarded, without checking the 32-bit PIF of the packet. In some embodiments, the 32 bit PIF is interrogated by hardware. In other embodiments, the PIF is interrogated by software program functions executed in a processor. When a unit of data having the desired standard multicast address is received, then at step 520, the 32-bit PIF transmitted with the received unit of data is compared to the 32 MSBs of the 64-bit DID calculated in step 502. If the received PIF matches the calculated 32-bits, then at step 522, the desired unit of data is "found."

If, however, the PIF contained in the received unit of data does not match the 32 MSBs of the calculated 64-bit DID in the standard marker, then a multicast collision is detected, and steps 524-530 are performed.

At step 524, the receiver waits to receive the alternate marker (or if the alternate marker has already been received, then the receiver examines the alternate marker).

At step 525, the alternate marker is checked, to determine whether the DID corresponding to the desired unit of data is listed in the alternate marker. If that DID is not listed in the alternate marker, then at step 526, a file-not-found condition is detected.

If the DID corresponding to the desired unit of data is listed in the alternate marker, then at step 527, the receiver reads the non-colliding MCI from the alternate marker.

At step 528, the receiver waits for the unit of data with the non-colliding MCI.

At step 530, when the packet having the non-colliding MCI is received, then the desired unit of data is found.

Variations of the method of FIG. 5 are contemplated. For example, in some embodiments, instead of using the 32-bit PIF to make the final comparison, the full 64-bit DID calculated by the server is included in each packet, and the receiver compares the full 64-bit DID of the received packet to the number contained in the marker. This provides an additional 16 bits that are independent of the MCI (as well as 16 bits that overlap with those used to form the MCI), for a total of 64 bits of entropy. The process flow is similar to that described above, except that at steps 514 and 520, the comparison is made to the 64-bit DID, instead of using the 32-bit PIF. In other embodiments, the PIF is composed of a different portion of the 64-bit DID than described above. In one example, the multicast address is formed by XORing segments A and C of the 64-bit DID, and the PIF is formed by concatenating segments B and D.

Overhead associated with the exemplary system described above is estimated as follows: Each file piece will increase by 10 bytes (6 additional bytes for the ID and 4 for the file length). A directory marker consuming one MPEG packet (188 bytes) every 10 seconds on every PID results in 700 packets per second in a 7000 PID map (Maximum packet rate is 17952/second). One DC2 packet will suffice for the PID map, which is cached. An event consumes 10 bytes in raw data; so about 16 events comprise a single MPEG packet. This works out to 5-6% of the bandwidth consumed by an exemplary file manager 49.

Given a file name, the exemplary "inband directory" system is able to provide fast lookups for existing files, as well as reasonably fast detection of non-existent files. It provides timely notification of changes to files (version changes) in a way that is easily monitored by the set top box 28. Synchronization between the directory (standard and alternate markers) and the files it represents are implicit. Minimal inband and settop resources are consumed. Inband bandwidth consumption is low, and settop CPU loading and memory usage is kept to a minimum. Lookup latency is optimized for speed, and the latency associated with lookup failure (files not found) is reasonably short. Large numbers of files are supported. Although 10,000 to 30,000 is considered nominal, the system is used to spin a larger number of files.

Figure 6:
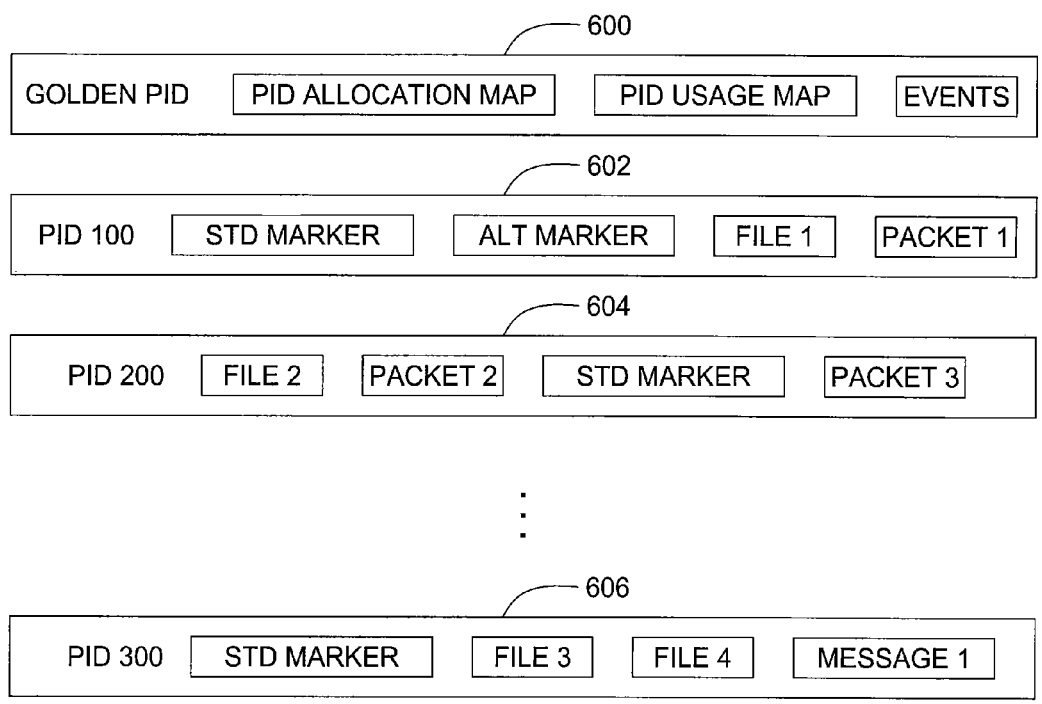
FIG. 6 is a block diagram of sample data being transmitted via several PIDs.

FIG. 6 is a diagram of data being transmitted via several PIDs. PIDs bearing no data carry no markers. Instead, a "PID usage" bitmap is sent on a separate PID 600 (referred to as the "golden PID") having a predetermined PID number. Once the receiver 28 determines the PID of the desired file, the receiver 28 checks the PID usage bitmap to determine whether that PID is currently in use. If the PID derivation calculation lands on an unused PID (bit is "off"), then a file-not-found is returned.

Although the exemplary embodiment places the standard and alternate markers on the individual PIDS 100, 200, 300 (reference numerals 602, 604 and 606, respectively) that carry payload data, other embodiments are contemplated in which an additional inband PID is allocated for sending and receiving the markers.

Although the exemplary embodiments use DC2 and MPEG formatted packets, in other embodiments, calculated directory type information is used with other packet formats. Although MPEG Program IDs are discussed above, in other embodiments including non-MPEG systems, calculated sub-channel assignments are used.

In the examples described above, the bit sequence used for the DID calculation is a file name. Bit sequences include, but are not limited to, alphanumeric strings. The DID serves as the basis for determining the PID, PIF and multicast address. In other embodiments, other unique strings and bit sequences besides file names are used. Also, in some embodiments, a bit sequence is used that is unique to a class of recipients. In other embodiments, a bit sequence is used that is unique to a class of files/packets. In other embodiments, other alternative keys uniquely associated with data and known to both the server and the receiver are used by the sender and receiver to generate the DID.

In other embodiments, the multicast identifier is not used. A field is added to a directory marker indicating the actual PID on which the unit of data is sent. In the event that two or more units of data have bit sequences that yield the same PID, the sender selects a non-conflicting PID, if an unused PID is available. The server minimizes the number of PIDs carrying multiple units of data. When a unit of data is assigned to a non-conflicting PID that is different from the PID determined by the calculation described above, the non-conflicting PID is listed in the directory marker.

The directory marker is sent in band. The 64-bit DID is calculated by sender and receiver, the PID is calculated by the sender as described above, and the PIF is calculated and included in the packet. For example, in some embodiments, the PIF is the 32 MSBs of the DID. The directory marker includes the DID and PID. If the receiver receives a unit of data having the PIF calculated by the receiver for the desired unit of data, then the receiver recognizes the received unit of data as being the desired unit of data. If the receiver listens the calculated PID and receives a unit of data that does not have the desired PIF, the receiver waits for and examines the directory marker. When the receiver receives the directory marker, the receiver looks for the PIF of the desired unit of data. If the desired PIF is not listed, a file-not-found condition is detected. If the desired PIF is found, the receiver listens to the "alternate PID" associated with the desired unit of data, as indicated in the directory marker, until the desired unit of data is received.

Many variations are contemplated. For example, in some embodiments the head end system cyclically broadcasts on at least one digital broadband channel a software control signal corresponding to at least one video information provider. In some embodiments, the software control signal includes data for identifying audio/video program information of the at least one video information provider to a digital entertainment terminal receiving the digital broadband channels and executable code for controlling the digital entertainment terminal.

The exemplary embodiments of present invention are embodied in the form of computer-implemented processes and apparatus for practicing those processes. Other embodiments are in the form of computer program code embodied in tangible media, such as random access memory (RAM), floppy diskettes, read only memories (ROMs), CD-ROMs, DVD-ROMs, hard drives, high density (e.g., "ZIP™" or "JAZZ™") removable disks, or any other computer-readable storage medium, wherein, when the computer program code is loaded into and executed by a computer, the computer becomes an apparatus for practicing the invention. Other embodiments are in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although some embodiments use software to perform the functions described above, other embodiments include application specific integrated circuits to perform these functions.

Although the invention has been described in terms of exemplary embodiments, it is not limited thereto. Rather, the appended claims should be construed broadly, to include other variants and embodiments of the invention, which are recognized by those skilled in the art without departing from the scope and range of equivalents of the invention.

What is claimed is:

1. A method for transporting files from a cable headend, comprising:
   for each of the files:
      transforming a file identifier of the file into a respective data identifier (DID):
      determining a packet identifier (PID) based on the DID, wherein the PID is associated with a communications channel selected to transport said file;
      determining a first identifier based on the DID; and
      transmitting, from the headend via the communications channel, one or more packets associated with the file, each of the one or more packets including the PID and the first identifier, wherein said first identifier is adapted to enable receivers of said communications channel to selectively receive one or more packets associated with the file among packets transported via the communications channel;
   wherein, for each of the files, the determining the first identifier based on the DID further comprises:
      dividing the DID into at least two portions; and
      performing one of:
         performing an XOR operation on two of the at least two portions to determine the first identifier; or
         concatenating at least two of the at least two portions to determine the first identifier.

2. The method of claim 1, wherein said communications channel transports an MPEG 2 bitstream.

3. The method of claim 1, wherein said communications channel transports Digicipher II data packets.

4. The method of claim 1, wherein said communications channel transports Service Information (SI) data packets.

5. The method of claim 1, wherein, for each of said files, said DID is generated with an approximately uniform probability distribution.

6. The method of claim 1, wherein the first identifier is a payload identifier.

7. The method of claim 1, wherein the first identifier is a multicast identifier.

8. The method of claim 7, further comprising:
   detecting a collision condition in which two packets, associated with different files having different file identifiers associated therewith, have identical PIDs and identical first identifiers;
   determining a non-colliding first identifier for one of the two packets;
   transmitting information associating the file associated with the one of the two packets with the non-colliding first identifier; and
   transmitting one or more packets, of the file associated with the one of the two packets, using the non-colliding first identifier.

9. The method of claim 8, wherein the non-colliding first identifier is formed by adding a constant to the first identifier for which the collision condition is detected.

10. The method of claim 1, wherein the file identifier is a file name or a binary number.

11. The method of claim 1, wherein, for each of the files, said transforming step comprises:
   calculating the DID based on one of the group consisting of a cyclic redundancy code, a hash function and a pseudorandom number formed from the respective file identifier.

12. The method of claim 11, wherein, for each of said files, the associated PID is determined by:
   (i) determining a PID index by the equation:

$$\text{PID index} = X \text{ modulo } \text{NPIDSON},$$

where PID index is an index into a table, X is a result of performing at least one XOR operation on two or more portions of the DID, and NPIDSON is a predetermined number;
   (ii) performing a table lookup using the PID index as a lookup parameter; and
   (iii) adding an offset to a value output by the table lookup to determine the PID.

13. The method of claim 11, further comprising transmitting a PID usage bitmap that identifies which PIDs are being used to transmit payload data.

14. The method of claim 1, wherein, for each of the files, the first identifier is formed by performing an XOR operation on two non-contiguous portions of the DID.

15. The method of claim 1, wherein, for each of the files, the first identifier is a the multicast identifier formed by performing an XOR operation on two non-contiguous portions of the DID, wherein the method further comprises:
   for each of the files, determining a second identifier based on the DID of the file, wherein the second identifier is a payload identifier formed by concatenating at least two portions of the DID.

16. The method of claim 1, wherein each of the files is transported using one of the group consisting of Moving Picture Experts Group (MPEG) 1 packets and MPEG 2 packets.

17. The method of claim 1,
wherein, for each file, the first identifier is a multicast identifier determined by selecting a first portion of the DID, wherein the method further comprises:
for each of the files, determining a second identifier based on the DID of the file, wherein the second identifier is a payload identifier determined by selecting a second portion of the DID.

18. A method for receiving a file from a server, the file having a file identifier associated therewith, the method comprising the steps of:
determining a data identifier (DID) from the file identifier of the file; and
determining a packet identifier (PID) based on the DID, wherein the PID is associated with a communications channel used to transport said file;
determining a first identifier based on the DID; and
selectively receiving one or more packets associated with the file, among packets transported via the communications channel, using the PID and the first identifier;
wherein, for each of the files, the determining the first identifier based on the DID further comprises:
dividing the DID into at least two portions; and
performing one of:
performing an XOR operation on two of the at least two portions to determine the first identifier; or
concatenating at least two of the at least two portions to determine the first identifier.

19. The method of claim 18, wherein the DID is determined based on a common function that is also used by the server to calculate the DID when the server determines which DID to assign to the packet.

20. The method of claim 18, wherein the DID is determined using one of the group consisting of a cyclic redundancy code, a hash function and a pseudorandom number generated using the file identifier as an input, the method further comprising:
selecting at least one portion of the DID as a second identifier, wherein the second identifier is a payload identifier; and
detecting payload data having the payload identifier transmitted therewith as the desired data.

21. The method of claim 18, wherein the first identifier is a multicast identifier, wherein the multicast identifier is formed by performing an XOR operation on two non-contiguous portions of the DID.

22. The method of claim 18, further comprising:
determining a second identifier based on the DID;
detecting a collision condition in which a received packet has a first identifier that matches the first identifier determined using the DID, but a second identifier associated with the received packet is different from the second identifier determined based on the DID;
receiving information associating the DID with a non-conflicting first identifier; and
receiving the one or more packets using the non-colliding first identifier.

23. The method of claim 18, wherein the DID is a 64-bit number, wherein the first identifier is a 16-bit number determined by selecting a 16-bit portion of the DID or by performing an XOR on two non-contiguous 16-bit portions of the DID.

24. A method for transmitting data, comprising the steps of:
calculating a plurality of data identifiers (DIDs) based on respective identifiers associated with respective sets of at least one packet;
associating each set of at least one packet with the respective DID calculated from the identifier for that set of at least one packet; and
calculating a plurality of packet identifiers (PIDs) based on the respective DIDs calculated for the respective sets of at least one packet; and
transmitting, to a receiver associated with one of the plurality of PIDs, a list including a respective DID for each set of at least one packet associated with the same PID as the receiver;
wherein, for each of the sets of at least one packet, the calculating a plurality of data identifiers (DIDs) further comprises:
dividing the DID into at least two portions; and
performing one of:
performing an XOR operation on two of the at least two portions to determine a first identifier; or
concatenating at least two of the at least two portions to determine a first identifier.

25. The method of claim 24, wherein said DID is generated with an approximately uniform distribution.

26. The method of claim 24, further comprising:
for each set of at least one packet:
determining a multicast identifier based on the DID associated with the set of at least one packet;
detecting a collision condition in which two packets associated with different ones of the sets of at least one packet have the same multicast identifier associated therewith;
determining a non-colliding multicast identifier for one of the two packets;
transmitting information associating the set of at least one packet associated with the one of the two packets with the non-colliding multicast identifier; and
transmitting one or more packets, of the set of at least one packet associated with the one of the two packets, using the non-colliding multicast identifier.

27. A method for receiving data, comprising the steps of:
(a) calculating a packet identifier (PID) based on an identifier associated with a desired set of at least one packet, the PID being associated with a receiver of the set of at least one packet; and
(b) receiving a list associated with the PID, the list containing a plurality of data identifiers (DIDs), each DID in the list corresponding to a respective set of at least one packet that is to be received using that PID;
wherein, for each of the respective set of at least one packet, the receiving the list containing the DIDs further comprises receiving DIDs that have been divided into at least two portions, wherein an XOR operation has been performed on two of the at least two portions to determine the first identifier or at least two of the at least two portions have been concatenated to determine a first identifier.

28. The method of claim 27, further comprising;
receiving a PID usage bitmap that identifies which PIDs are being used to transmit payload packets; and
determining whether the desired set of at least one packet is available using the PID usage bitmap and the calculated PID for the desired set of at least one packet.

29. The method of claim 28, further comprising:
detecting a file-not-found condition if the calculated PID for the desired set of at least one packet is identified as not being used to transmit data in the PID usage bitmap.

30. The method of claim 28, further comprising:
detecting a file-not-found condition if the calculated PID for the desired set of at least one packet is identified as being used to transmit data in the PID usage bitmap, and the DID corresponding to the desired set of at least one packet is not included in the list containing the plurality of DIDs for that receiver.

31. A system for transmitting a file from a sender to a receiver, the system comprising:
a sender storage medium for storing said file, said file having a corresponding file identifier;
a converter for converting the contents of said file into one or more packets to be transmitted; and
a sender transformer for:
transforming the file identifier into a respective data identifier (DID);
determining a packet identifier (PID) based on the DID, wherein the PID is associated with a communications channel; and
determining a first identifier based on the DID;
wherein said converter is adapted to incorporate the PID and the first identifier into the one or more packets for transmission toward said receiver via the communications channel; and
wherein, for each of the files, the determining the first identifier based on the DID further comprises:
dividing the DID into at least two portions; and
performing one of:
performing an XOR operation on two of the at least two portions to determine the first identifier; or
concatenating at least two of the at least two portions to determine the first identifier.

32. The system of claim 31, wherein the system further comprises a receiver, wherein said receiver is adapted to determine the first identifier using the file identifier and is further adapted to use the first identifier to selectively receive one or more packets associated with the file among packets transported via the communications channel.

33. The system of claim 31, wherein the server transmits a PID usage bitmap that identifies which PIDs are being used to transmit payload data.

34. The system of claim 31, wherein the system further comprises a receiver that includes:
a processor for calculating the PID for a desired set of at least one packet using the same calculation used by the server to calculate the PID for the at least one packet, and the processor detects a file-not-found condition if the PID for the desired at least one packet is not listed in a PID usage bitmap as being used to transmit pay load data.

35. A system for receiving a desired file from a provider, comprising:
a client processor configured to:
transform a file identifier of a desired file into a respective data identifier (PID);
determine a packet identifier (PID) based on the PID, wherein the PID is associated with a communications channel;
determining a first identifier based on the DID; and
use at least the first identifier to select one or more packets associated with the desired file, from among packets transported via the communications channel;
wherein the client processor determines the DID, PID, and first identifier based on one or more common functions used by the provider to determine the DID, PID, and first identifier for the one or more packets before transmitting the one or more packets associated with the desired file via the communications channel;
wherein, for each of the files, the determining the first identifier based on the DID further comprises:
dividing the DID into at least two portions; and
performing one of:
performing an XOR operation on two of the at least two portions to determine the first identifier; or
concatenating at least two of the at least two portions to determine the first identifier.

36. The system of claim 35, wherein the client processor generates the DID with an approximately uniform probability distribution.

37. The system of claim 35, wherein the first identifier is a multicast identifier wherein the client processor determines the first identifier by performing an XOR on at least two non-contiguous portions of the DID.

38. The system of claim 37, wherein the client processor is further configured to:
determine a second identifier based on the DID;
detect a collision condition in which a received packet has a first identifier that matches the first identifier determined by the client processor using the DID, but a second identifier associated with the received packet is different from the second identifier determined by the client processor using the DID;
receive information associating the DID with a non-colliding first identifier; and
receive the one or more packets associated with the desired file using the non-colliding first identifier.

39. The system of claim 35, wherein the file identifier is a filename of the file or a binary number associated with the file.

40. The system of claim 35, wherein the client processor calculates the DID based on one of the group consisting of a cyclic redundancy code, a hash function and a pseudorandom number formed from the file identifier.

41. A computer readable medium encoded with computer program code, wherein when the computer program code is executed by a sewer processor, the server processor performs a method for transmitting one or more packets of a file, the method comprising the steps of:
determining a data identifier (DID) based on a file identifier of the file;
determining a packet identifier (PID) based on the DID;
determining a first identifier based on the DID;
assigning said PID and said first identifier to each of said one or more packets; and
transmitting said one or more packets toward a receiver;
wherein, for each file, the determining the first identifier based on the DID further comprises:
dividing the DID into at least two portions; and
performing one of:
performing an XOR operation on two of the at least two portions to determine the first identifier; or
concatenating at least two of the at least two portions to determine the first identifier.

42. A method of transmitting payload data from a headend to a television converter, comprising the steps of:
spinning a plurality of data units from the group consisting of packets and files without transmitting a directory of all of the data units being spun; and
calculating information used to spin the units of data by a common calculation that is used by the television converter to receive the units of data without a directory of all of the data units being spun;

wherein, for each file, the calculating information used to spin the units of data by a common calculation that is used by the television converter to receive the units of data without a directory of all of the data units being spun further comprises:
  determining a data identifier (DID) based on a file identifier of a file;
  divides the data identifier into at least two portions; and
  performing one of:
    performing an XOR operation on two of the at least two portions to determine a first identifier; or
    concatenating at least two of the at least two portions to determine the first identifier.

43. In a system including at least one file storage medium, said file storage medium including at least one file to be transported from a file sender to a file receiver, wherein each of said at least one file to be transported has associated therewith a corresponding file identifier, a sender comprising:
  a packetizer;
  a transform;
  a mulitplexer;
  at least one file manager communicating with said file storage medium, said packetizer and said transform such that each of said at least one file on said file storage medium is provided to said packetizer and said corresponding at least one file identifier is provided to said transform;
  said transform, for each of said at least one file, determining a data identifier (DID) based on the file identifier of the file, determining a packet identifier (PID) based on the DID, determining a first identifier based on the DID, and providing; the PID and the first identifier to the packetizer;
  said packetizer, for each of said at least one file, providing at least one corresponding data packet comprising said file to said multiplexer;
  said multiplexer, for each of said at least one file, providing a packetized bitstream including said file to be transported, each packet of said bitstream including at least a portion of said file;
  wherein, for each file, the transform determining the first identifier based on the DID further:
    divides the DID into at least two portions; and
    performs one of:
      performing an XOR operation on two of the at least two portions to determine the first identifier; or
      concatenating at least two of the at least two portions to determine the first identifier.

44. The system of claim 43 further including a data carousel in communication with said packetizer and said mulitplexer, wherein said packetizer provides said packets to said data carousel based upon said corresponding PID.

45. In a system including at least one file storage medium including at least one file to be transported from a sender to a receiver, wherein each of said at least one file to be transported has associated therewith a corresponding file identifier, a receiver comprising:
  at least one tunable filter;
  a transform;
  a packet processor; and
  a processor programmed to utilize said at least one file to be transported;
  said processor, for each of said at least one file, providing said file identifier of said file to said transform;
  said transform, for each of said at least one file, determining a data identifier (DID) based on the file identifier of the file, determining a packet identifier (PID) based on the DID, and providing the PID corresponding to said file to a tunable filter such that said tunable filter selects packets comprising said file and provides said selected packets to said packet processor;
  said packet processor providing said file to said processor;
  wherein, for each file, the transform determining the first identifier based on the DID further:
    divides the DID into at least two portions; and
    performs one of:
      performing an XOR operation on two of the at least two portions to determine the first identifier; or
      concatenating at least two of the at least two portions to determine the first identifier.

* * * * *

UNITED STATES PATENT AND TRADEMARK OFFICE
CERTIFICATE OF CORRECTION

Page 1 of 1

PATENT NO. : 7,594,254 B2
APPLICATION NO. : 10/805728
DATED : September 22, 2009
INVENTOR(S) : Parnell et al.

It is certified that error appears in the above-identified patent and that said Letters Patent is hereby corrected as shown below:

Title page, (56) References Cited, FOREIGN PATENT DOCUMENTS: "EP 05 72 4907 2/2007" should read --Supplementary EP Search Report EP 05 72 4907 02/2007--

Col. 8, lines 47-48: "of the64-bit DID comprise" after should read --of the 64-bit DID comprise--

Signed and Sealed this
Tenth Day of April, 2012

David J. Kappos
*Director of the United States Patent and Trademark Office*